US012595364B2

(12) United States Patent
Jang et al.

(10) Patent No.: US 12,595,364 B2
(45) Date of Patent: Apr. 7, 2026

(54) THERMOPLASTIC RESIN COMPOSITION FOR AIR INTAKE HOSE WITH IMPROVED HEAT RESISTANCE AND MOLDED ARTICLE COMPRISING SAME

(71) Applicants: HYUNDAI MOTOR COMPANY, Seoul (KR); KIA CORPORATION, Seoul (KR); HANWHA ADVANCED MATERIALS CORPORATION, Seoul (KR)

(72) Inventors: Young Hak Jang, Seoul (KR); Jong Min Park, Incheon (KR); Yong Jun Cho, Seoul (KR); Hoon Jeong Kim, Sejong-si (KR)

(73) Assignees: HYUNDAI MOTOR COMPANY, Seoul (KR); KAI CORPORATION, Seoul (KR); HANWHA ADVANCED MATERIALS CORPORATION, Seoul (KR)

( * ) Notice: Subject to any disclaimer, the term of this patent is extended or adjusted under 35 U.S.C. 154(b) by 443 days.

(21) Appl. No.: 18/197,845

(22) Filed: May 16, 2023

(65) Prior Publication Data

US 2024/0132717 A1    Apr. 25, 2024
US 2024/0228772 A9    Jul. 11, 2024

(30) Foreign Application Priority Data

Oct. 20, 2022    (KR) ........................ 10-2022-0135319

(51) Int. Cl.
| | |
|---|---|
| *C08L 67/06* | (2006.01) |
| *C08K 3/04* | (2006.01) |
| *C08K 3/32* | (2006.01) |
| *C08K 3/34* | (2006.01) |
| *C08K 5/00* | (2006.01) |
| *C08K 5/13* | (2006.01) |
| *C08K 5/205* | (2006.01) |
| *C08K 5/3412* | (2006.01) |

(52) U.S. Cl.
CPC ................ *C08L 67/06* (2013.01); *C08K 3/04* (2013.01); *C08K 3/32* (2013.01); *C08K 3/346* (2013.01); *C08K 5/005* (2013.01); *C08K 5/13* (2013.01); *C08K 5/205* (2013.01); *C08K 5/3412* (2013.01); *C08K 2201/011* (2013.01); *C08K 2201/014* (2013.01); *C08L 2201/08* (2013.01); *C08L 2205/035* (2013.01); *C08L 2207/04* (2013.01); *C08L 2310/00* (2013.01)

(58) Field of Classification Search
None
See application file for complete search history.

(56) References Cited

FOREIGN PATENT DOCUMENTS

| | | | | |
|---|---|---|---|---|
| JP | 2001240663 A | * | 9/2001 | |
| KR | 2011-0006103 A | | 1/2011 | |
| KR | 2019-0133930 A | | 12/2019 | |
| KR | 20200036548 A | * | 4/2020 | |
| WO | 2001240663 A | * | 12/2019 | |

* cited by examiner

*Primary Examiner* — Tae H Yoon
(74) *Attorney, Agent, or Firm* — MCDONNELL BOEHNEN HULBERT & BERGHOFF LLP

(57) ABSTRACT

A thermoplastic resin composition for an air intake hose has improved heat resistance by mixing a mixed resin including a thermoplastic polyether-ester elastomer and polybutylene terephthalate, a styrene-acrylonitrile resin, and additives in appropriate amounts, and a molded article including the same. This thermoplastic resin composition includes a mixed resin including a thermoplastic polyether-ester elastomer and polybutylene terephthalate, a styrene-acrylonitrile resin, an epoxy-based compatibilizer, a chain extender, an antioxidant, a thermal stabilizer including at least one selected from the group consisting of an imide-based stabilizer, an oxazoline-based stabilizer, and combinations thereof, a light stabilizer, and a filler.

12 Claims, No Drawings

THERMOPLASTIC RESIN COMPOSITION FOR AIR INTAKE HOSE WITH IMPROVED HEAT RESISTANCE AND MOLDED ARTICLE COMPRISING SAME

CROSS REFERENCE TO RELATED APPLICATIONS

This application claims, under 35 U.S.C. § 119(a), the benefit of priority from Korean Patent Application No. 10-2022-0135319, filed on Oct. 20, 2022, the entire contents of which are incorporated herein by reference.

BACKGROUND

(a) Technical Field

The present disclosure relates to a thermoplastic resin composition, and more particularly to a thermoplastic resin composition for an air intake hose with improved heat resistance by mixing a mixed resin including a thermoplastic polyether-ester elastomer and polybutylene terephthalate, a styrene-acrylonitrile resin, and additives in appropriate amounts, and a molded article including the same.

(b) Background Art

An air intake hose provided to an automobile serves to send air sucked from the outside of the automobile to an air cleaner or to transfer the filtered air from the air cleaner to a throttle body of an automobile engine, and is a part installed in an automobile engine compartment that forms an air flow path between the engine and the air cleaner.

A conventional air intake hose includes an engine connection part connected to an engine, an air cleaner connection part connected to an air cleaner, and a bellows connecting the engine connection part (high-temperature part) and the air cleaner connection part. The engine connection part is formed of an ethylene-methyl acrylate (AEM) material having heat resistance to high temperatures of about 150° C. delivered from the engine side.

In addition, a material containing epichlorohydrin rubber (ECO) capable of withstanding temperatures of about 130 to 140° C. is applied to general parts except for the above part.

However, such ECO has poor heat resistance, and thus the connector between the parts may be aged and torn, and the AEM material is heavy and has high specific gravity, which makes it difficult to realize weight reduction, and it is very expensive, which leads to an economic burden.

In order to replace these materials, development of a TPC-ET (thermoplastic ether-ester elastomer) material is required. Also, a conventional TPC-ET material may be used at a temperature of 130° C., and is thus unsuitable as a material for the high-temperature part of the air intake hose capable of withstanding high temperatures of about 150° C.

Against this background, it is necessary to develop a thermoplastic resin composition having superior heat resistance and oil resistance that may be applied to a high-temperature part of an air intake hose, which is an automobile part.

SUMMARY

An object of the present disclosure is to provide a thermoplastic resin composition for an air intake hose with improved heat resistance that may be applied even at a high temperature of 150° C. and a molded article including the same.

The objects of the present disclosure are not limited to the foregoing. The objects of the present disclosure will be able to be clearly understood through the following description and to be realized by the means described in the claims and combinations thereof.

The present disclosure provides a thermoplastic resin composition including a mixed resin including a thermoplastic polyether-ester elastomer and polybutylene terephthalate, a styrene-acrylonitrile resin, an epoxy-based compatibilizer, a chain extender, an antioxidant, a thermal stabilizer including at least one selected from the group consisting of an imide-based stabilizer, an oxazoline-based stabilizer, and combinations thereof, a light stabilizer, and a filler.

The thermoplastic resin composition may include 100 parts by weight of the mixed resin, 0.1 to 2 parts by weight of the styrene-acrylonitrile resin, 0.5 to 2 parts by weight of the epoxy-based compatibilizer, 0.3 to 0.7 parts by weight of the chain extender, 0.3 to 0.5 parts by weight of the antioxidant, 2 to 7 parts by weight of the thermal stabilizer, 0.1 to 0.5 parts by weight of the light stabilizer, and 0.2 to 1.5 parts by weight of the filler.

The mixed resin may include, based on the total weight thereof, 50 to 90 wt % of the thermoplastic polyether-ester elastomer and 10 to 50 wt % of the polybutylene terephthalate.

The styrene-acrylonitrile resin may have a weight average molecular weight (Mw) of 100,000 to 150,000 g/mol.

The chain extender may include carbonyl biscaprolactam.

The antioxidant may include at least one selected from the group consisting of a phenol-based antioxidant, a phosphorus-based antioxidant, and combinations thereof, and the antioxidant may include, based on the total weight thereof, 50 to 70 wt % of the phenol-based antioxidant and 30 to 50 wt % of the phosphorus-based antioxidant.

The thermal stabilizer may include, based on the total weight thereof, 50 to 70 wt % of the imide-based stabilizer and 30 to 50 wt % of the oxazoline-based stabilizer.

The imide-based stabilizer may have a weight average molecular weight (Mw) of 20,000 g/mol or more.

The imide-based stabilizer may include polymeric bis-(2, 6-diisopropylphenyl)carbodiimide, and the oxazoline-based stabilizer may include 1,3-bis(4,5-dihydro-2-oxazolyl)benzene.

The light stabilizer may include at least one selected from the group consisting of a hindered amine-based light stabilizer (HALS), an oxanilide-based light stabilizer, and combinations thereof.

The filler may include at least one selected from the group consisting of nanoclay, talc, mica, calcium carbonate, wollastonite, barium sulfate, and combinations thereof.

The thermoplastic resin composition may further include, based on 100 parts by weight of the mixed resin, 1 to 2 parts by weight of a master batch including carbon black or dye black.

In addition, the present disclosure provides a molded article including the thermoplastic resin composition described above.

DETAILED DESCRIPTION

The above and other objects, features and advantages of the present disclosure will be more clearly understood from the following preferred embodiments described below.

However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A thermoplastic resin composition according to an aspect of the present disclosure includes a mixed resin including a thermoplastic polyether-ester elastomer and polybutylene terephthalate, a styrene-acrylonitrile resin, an epoxy-based compatibilizer, a chain extender, an antioxidant, a thermal stabilizer including at least one selected from the group consisting of an imide-based stabilizer, an oxazoline-based stabilizer, and combinations thereof, a light stabilizer, and a filler.

Specifically, the thermoplastic resin composition may include 100 parts by weight of the mixed resin, 0.1 to 2 parts by weight of the styrene-acrylonitrile resin, 0.5 to 2 parts by weight of the epoxy-based compatibilizer, 0.3 to 0.7 parts by weight of the chain extender, 0.3 to 0.5 parts by weight of the antioxidant, 2 to 7 parts by weight of the thermal stabilizer, 0.1 to 0.5 parts by weight of the light stabilizer, and 0.2 to 1.5 parts by weight of the filler.

Below, individual components for the thermoplastic resin composition according to the present disclosure are described in more detail.

(A) Mixed Resin

The thermoplastic resin composition according to the present disclosure may include 100 parts by weight of the mixed resin.

The mixed resin may include 50 to 90 wt % of a thermoplastic polyether-ester elastomer (TPC-ET) and 10 to 50 wt % of polybutylene terephthalate (PBT), based on the total weight thereof.

The polyether-ester elastomer is used as a matrix material in the thermoplastic resin composition, and a resin having superior oil resistance, durability, and elasticity may be used.

The polybutylene terephthalate is used to impart superior heat resistance, rigidity, and long-term durability to the thermoplastic resin composition. Preferably, polybutylene terephthalate having high viscosity is used.

(B) Styrene-Acrylonitrile (SAN) Resin

The styrene-acrylonitrile resin is added to improve parison sagging during blow molding in a final product.

The styrene-acrylonitrile resin may be included in an amount of 0.1 to 2 parts by weight based on 100 parts by weight of the mixed resin in the thermoplastic resin composition.

If the amount of the styrene-acrylonitrile resin falls out of the above range, a problem may occur in moldability of a final product.

The styrene-acrylonitrile resin having an ultrahigh molecular weight may be used. Specifically, the styrene-acrylonitrile resin may have a weight average molecular weight (Mw) of 100,000 to 150,000 g/mol.

(C) Epoxy-Based Compatibilizer

The epoxy-based compatibilizer is added to improve compatibility between the polyether-ester elastomer and the polybutylene terephthalate contained in the mixed resin.

In the present disclosure, the use of the epoxy-based compatibilizer is effective not only to improve compatibility between the polyether-ester elastomer and the polybutylene terephthalate, but also to increase physical properties such as tensile strength and tear strength and enhance viscosity.

The epoxy-based compatibilizer may be included in an amount of 0.5 to 2 parts by weight based on 100 parts by weight of the mixed resin in the thermoplastic resin composition.

If the amount of the epoxy-based compatibilizer is less than 0.5 parts by weight based on 100 parts by weight of the mixed resin, compatibility between the polyether-ester elastomer and the polybutylene terephthalate may be insignificant. On the other hand, if the amount of the epoxy-based compatibilizer exceeds 2 parts by weight based on 100 parts by weight of the mixed resin, blow moldability may become poor in the final product.

Preferably, in the present disclosure, the epoxy-based compatibilizer is an additive including glycidyl methacrylate (methacrylic acid 2,3-epoxypropyl ester).

(D) Chain Extender

The chain extender may serve to improve blow moldability by increasing the viscosity of the mixed resin including the polyether-ester elastomer and polybutylene terephthalate.

The chain extender may be included in an amount of 0.3 to 0.7 parts by weight based on 100 parts by weight of the mixed resin in the thermoplastic resin composition. If the amount of the chain extender falls out of the above range, a problem may occur in moldability of the final product.

Specifically, the chain extender is preferably an additive including cabonyl biscaprolactam.

(E) Antioxidant

The antioxidant is used to suppress oxidative degradation during blow molding of the final product.

The antioxidant may be included in an amount of 0.3 to 0.5 parts by weight based on 100 parts by weight of the mixed resin in the thermoplastic resin composition. If the amount of the antioxidant is less than 0.3 parts by weight based on 100 parts by weight of the mixed resin, physical properties of the thermoplastic resin composition may be deteriorated. On the other hand, if the amount of the antioxidant exceeds 0.5 parts by weight based on 100 parts by weight of the mixed resin, appearance quality of the final product may be poor.

The antioxidant may include at least one selected from the group consisting of a phenol-based antioxidant, a phosphorus-based antioxidant, and combinations thereof.

The antioxidant may include 50 to 70 wt % of the phenol-based antioxidant and 30 to 50 wt % of the phosphorus-based antioxidant, based on the total weight thereof.

5

Specifically, the phenol-based antioxidant may include any one selected from the group consisting of 1,3,5-trimethyl-2,4,6-tris(3,5-di-tert-butyl-4-hydroxybenzyl)benzene, 1,6-bis[3-(3,5-di-tert-butyl-4-hydroxyphenyl)propionamido]hexane, 1,6-bis[3-(3,5-di-tert-butyl-4-hydroxyphenyl)propionamido]propane, and tetrakis[methylene(3,5-di-tert-butyl-4-hydroxyhydrocinnamate)]methane. The phosphorus-based antioxidant may include any one selected from the group consisting of tris(2,4-di-tert-butylphenyl)pentaerythritol-di-phosphite, bis(2,6-di-tert-butyl-4-methylphenyl)pentaerythritol-di-phosphite, and bis(2,4-di-tert)-butylphenyl)pentaerythritol-di-phosphite.

(F) Thermal Stabilizer

The thermal stabilizer is used to improve long-term heat resistance at high temperatures of the final product. The thermal stabilizer may be included in an amount of 2 to 7 parts by weight based on 100 parts by weight of the mixed resin in the thermoplastic resin composition.

If the amount of the thermal stabilizer is less than 2 parts by weight based on 100 parts by weight of the mixed resin, the effect of long-term heat resistance may not be properly exhibited. On the other hand, if the amount of the thermal stabilizer exceeds 7 parts by weight based on 100 parts by weight of the mixed resin, appearance quality of the final product may not be good.

Specifically, the thermal stabilizer may include 50 to 70 wt % of the imide-based stabilizer and 30 to 50 wt % of the oxazoline-based stabilizer based on the total weight thereof.

The imide-based stabilizer may have a weight average molecular weight (Mw) of 20,000 g/mol or more. Specifically, the imide-based stabilizer that is used may be polymeric bis-(2,6-diisopropylphenyl)carbodiimide.

The oxazoline-based stabilizer that is used may be 1,3-bis-(4,5-dihydro-2-oxazolyl)benzene.

(G) Light Stabilizer

The light stabilizer is used to reduce discoloration in the final product. The light stabilizer may be included in an amount of 0.1 to 0.5 parts by weight based on 100 parts by weight of the mixed resin in the thermoplastic resin composition. If the amount of the light stabilizer is less than 0.1 parts by weight based on 100 parts by weight of the mixed resin, it is difficult to sufficiently exhibit the effect of the light stabilizer. On the other hand, if the amount of the light stabilizer exceeds 0.5 parts by weight based on 100 parts by weight of the mixed resin, physical properties of the thermoplastic resin composition may be deteriorated.

The light stabilizer may include at least one selected from the group consisting of a hindered amine-based light stabilizer, an oxanilide-based light stabilizer, and combinations thereof.

Specifically, the light stabilizer preferably includes, as the hindered amine-based light stabilizer, a polymer of 2,2,4,4-tetramethyl-7-oxa-3,20-diaza-dispiro[5.1.11.2]-heneicosan-21-one and epichlorohydrin, and as the oxanilide-based light stabilizer, N-(2-ethoxyphenyl)-N'-(4-ethylphenyl)-ethylene diamide.

(H) Filler

The filler is used to improve fluidity and releasability of the mixed resin in the thermoplastic resin composition.

The filler may be included in an amount of 0.2 to 1.5 parts by weight based on 100 parts by weight of the mixed resin. If the amount of the filler is less than 0.2 parts by weight based on 100 parts by weight of the mixed resin, fluidity and releasability may be deteriorated. On the other hand, if the amount of the filler exceeds 1.5 parts by weight based on 100 parts by weight of the mixed resin, physical properties and fusion strength may be deteriorated.

The filler may include at least one selected from the group consisting of nanoclay, talc, mica, calcium carbonate, wollastonite, barium sulfate, and combinations thereof. In the present disclosure, the filler may be nanoclay, preferably montmorillonite.

(I) Master Batch

A master batch is used to improve color stability and blow extrusion workability in the thermoplastic resin composition. The master batch may include those commonly used in the same technical field without any particular limitation within a range that does not impair the effects of the present disclosure.

The master batch may be included in an amount of 1 to 2 parts by weight based on 100 parts by weight of the mixed resin.

If the amount of the master batch is less than 1 part by weight, superior color stability cannot be achieved. On the other hand, if the amount of the master batch exceeds 2 parts by weight, physical properties of the thermoplastic resin composition may be deteriorated.

The master batch may include carbon black, dye black, or a mixture thereof in a conventionally known ratio and manner, as necessary.

Another aspect of the present disclosure pertains to a molded article including the thermoplastic resin composition.

The molded article may be obtained by molding the thermoplastic composition through a process such as extrusion molding, injection molding, compression molding, foam injection molding, low-pressure foaming injection molding, gas compression molding, etc.

The molded article may be applied to molded products in the field requiring high-temperature characteristics, although there is no limit in the field of use thereof. For example, the molded article may be applied to parts such as automobile parts, mechanical parts, electrical and electronic parts, office equipment such as computers, miscellaneous goods, and the like. Preferably, the molded article is applied to automobile parts such as air intake hoses, dust covers, R&P bellows, CVJ boots, and the like through blow molding using a polymer material having heat resistance, rigidity, and chemical resistance.

A better understanding of the present disclosure may be obtained through the following examples. These examples are merely set forth to illustrate the present disclosure, and are not to be construed as limiting the scope of the present disclosure.

Example and Comparative Examples

Respective thermoplastic resin compositions were prepared using components in the amounts shown in Table 1 below.

TABLE 1

| Component (parts by weight) | Com. Example 1 | Com. Example 2 | Com. Example 3 | Com. Example 4 | Com. Example 5 | Com. Example 6 | Com. Example 7 | Com. Example 8 | Com. Example 9 | Com. Example 10 | Example 1 |
|---|---|---|---|---|---|---|---|---|---|---|---|
| (A-1) High heat-resistant polyester elastomer | 100 | — | — | — | — | — | — | — | — | — | — |

TABLE 1-continued

| Component (parts by weight) | | Com. Exam- ple 1 | Com. Exam- ple 2 | Com. Exam- ple 3 | Com. Exam- ple 4 | Com. Exam- ple 5 | Com. Exam- ple 6 | Com. Exam- ple 7 | Com. Exam- ple 8 | Com. Exam- ple 9 | Com. Exam- ple 10 | Exam- ple 1 |
|---|---|---|---|---|---|---|---|---|---|---|---|---|
| (A-2) Mixed resin | TPC-ET | — | 70 | 70 | 70 | 70 | 70 | 70 | 70 | 70 | 70 | 70 |
| | PBT | — | 30 | 30 | 30 | 30 | 30 | 30 | 30 | 30 | 30 | 30 |
| (B) SAN | | — | — | — | — | — | — | 1 | — | — | — | 1 |
| (C) Epoxy-based compatibilizer | | — | — | 0.5 | 0.5 | 0.5 | 0.5 | 1.5 | 1.5 | 1.5 | 1.5 | 1.5 |
| (D) Chain extender | | — | — | — | — | 0.3 | 0.5 | — | — | — | — | 0.5 |
| (E) Antioxidant | Phenol- based | — | 0.3 | 0.3 | 0.3 | 0.3 | 0.3 | 0.3 | 0.3 | 0.3 | 0.3 | 0.3 |
| | Phosphorus- based | — | 0.2 | 0.2 | 1.5 | 0.2 | 0.2 | 0.2 | 0.2 | 0.2 | | 0.2 |
| (F) Thermal stabilizer | Imide- based | — | — | — | — | 1 | — | 0.5 | 2 | 2 | 3 | 3 |
| | Oxazoline- based | — | — | — | — | — | 1 | 0.5 | — | 2 | 2 | 2 |
| (G) Light stabilizer | | — | 0.3 | 0.4 | — | — | — | — | — | — | — | 0.4 |
| (H) Filler | | — | — | 1 | 2 | — | — | — | — | — | — | 1 |
| (I) Master batch | | — | 1.5 | 1.5 | 1.5 | 1.5 | 1.5 | 1.5 | 1.5 | 1.5 | 1.5 | 1.5 |

[Components of composition]
(A-1): High heat-resistant polyester elastomer (conventional product)
(A-2):
TPC-ET (Thermoplastic ether-ester elastomer)
PBT (Polybutylene terephthalate)
(B): SAN (Styrene-acrylonitrile)
(C): Epoxy-based compatibilizer: Methacrylic acid 2,3-epoxypropyl ester
(D): Chain extender: Carbonyl biscaprolactam
(E): Antioxidant
Phenol-based
Phosphorus-based
(F): Thermal stabilizer
Imide-based: Polymeric bis-(2,6-diisopropylphenyl)carbodiimide, high molecular weight (20,000 g/mol or more)
Oxazoline-based: 1,3-Bis(4,5-dihydro-2-oxazolyl)benzene
(G): Light stabilizer:
Oligomeric hindered amine-based light stabilizer (HALS): polymer of 2,2,4,4-tetramethyl-7-oxa-3,20-diaza-dispiro[5.1.11.2]-heneicosan-21-one and epichloro-hydrin,
Oxanilide-based light stabilizer: N-(2-Ethoxyphenyl)-N'-(4-ethylphenyl)-ethylene diamide
(H) Filler: Nanoclay (Montmorillonite)
(I) Master batch The thermoplastic resin composition of each of Example and Comparative Examples was manufactured into a specimen for measuring physical properties using an injection molding machine.

The physical properties of the specimen thus manufactured were measured through evaluation methods according to the following items. The results are shown in Table 2 below.

Evaluation Methods (1) Melt index: Melt index (g/10 min) of the specimen was measured under conditions of 10 kg at respective temperatures of 225° C. and 230° C.

(2) Blow moldability: The moldability of the injected specimen was visually observed and evaluated (The result was judged to be 1 to 5, the closer to 1, the worse the blow moldability, and the closer to 5, the better the blow moldability).

(3) Gas permeability (mol·m/(m²·s·pa), 2t): Gas permeability was measured through a test method according to JIS K7126, ASTM D 1434.

(4) Appearance improvement (Gray scale): A grade of 1 to 5 was determined with the naked eye using a gray scale. Here, it is evaluated that the higher the grade of the gray scale, the better the appearance.

(5) Tensile strength: The tensile strength (kgf/cm 2) of the specimen was measured using ASTM D648 according to ISO37. Specifically, the specimen that was used was Dumbbell TYPE 1 (ISO No. 1 type), and the test speed was 200 mm/min.

(6) Elongation: The elongation (%) of the specimen was measured using ASTM D648.

(7) Heat resistance: Using ASTM D628, a tensile strength change (%) and a change in elongation at break (%) of the specimen before and after aging at 150° C. for 336 hours were measured.

TABLE 2

| Evaluation items (physical properties) | | Com. Exam- ple 1 | Com. Exam- ple 2 | Com. Exam- ple 3 | Com. Exam- ple 4 | Com. Exam- ple 5 | Com. Exam- ple 6 | Com. Exam- ple 7 | Com. Exam- ple 8 | Com. Exam- ple 9 | Com. Exam- ple 10 | Exam- ple 1 |
|---|---|---|---|---|---|---|---|---|---|---|---|---|
| Melt index | (225° C., g/10 min) | 7 | 22 | 18 | 16 | 11 | 11 | 8 | 9 | 9 | 9 | 7 |
| | (230° C., g/10 min) | 9 | 24 | 22 | 19 | 13 | 14 | 9 | 11 | 12 | 11 | 8 |

TABLE 2-continued

| Evaluation items (physical properties) | Com. Example 1 | Com. Example 2 | Com. Example 3 | Com. Example 4 | Com. Example 5 | Com. Example 6 | Com. Example 7 | Com. Example 8 | Com. Example 9 | Com. Example 10 | Example 1 |
|---|---|---|---|---|---|---|---|---|---|---|---|
| Blow moldability | 5 | 1 | 2 | 2 | 3 | 3.5 | 4.5 | 4 | 4 | 4 | 5 |
| Gas permeability (molm/(m²spa), 2t) | 8.33E−15 | 4.94E−15 | 5.82E−16 | 3.94E−16 | — | — | — | — | — | — | 5.51E−16 |
| Appearance improvement (Gray scale) | 3 | 4 | 4.4 | 3 | 3 | 3 | 3 | 3 | 3 | 3 | 4.5 |
| Tensile strength (kgf/cm²) | 328 | 331 | 339 | 328 | 319 | 330 | 331 | 325 | 317 | 324 | 327 |
| Elongation (%) | 321 | 318 | 312 | 324 | 329 | 323 | 321 | 319 | 328 | 32 | 325 |
| Heat resistance (150° C. *336 hr) Tensile strength change (%) | −20 | −83 | −81 | −83 | −56 | −67 | −61 | −35 | −14 | −2 | −3 |
| Change in elongation at break (%) | −13 | −91 | −92 | −88 | −70 | −83 | −78 | −41 | −23 | −12 | −11 |

With reference to the results of Table 2, in Comparative Example 7 and Example 1, the styrene-acrylonitrile resin having an ultrahigh molecular weight was added in an amount of 0.1 to 2 parts by weight based on 100 parts by weight of the mixed resin, confirming superior blow moldability due to no variation in parison sagging depending on a change in the temperature.

However, in Comparative Example 7, the chain extender, the light stabilizer, and the filler were not properly added, such that appearance, gas permeability, and heat resistance performance were not good compared to Example.

In Comparative Examples 2 and 3 and Example 1, the light stabilizer was added in an amount of 0.1 to 0.5 parts by weight based on 100 parts by weight of the mixed resin, confirming that the gray scale of the product surface after aging was improved.

In Comparative Examples 3 and 4 and Example 1, the filler was added in an amount of 0.2 to 1.5 parts by weight based on 100 parts by weight of the mixed resin, indicating superior gas permeability.

However, in Comparative Examples 2, 3, and 4, the styrene-acrylonitrile resin, the epoxy-based compatibilizer, the chain extender, and the light stabilizer were not properly added, such that blow moldability and heat resistance performance were not good compared to Example.

In the heat resistance evaluation carried out at a temperature of 150° C. for 336 hours, Example 1 exhibited the lowest changes compared to Comparative Examples, indicating best heat resistance.

Accordingly, in Example 1 including 100 parts by weight of the mixed resin including the thermoplastic polyether-ester elastomer and polybutylene terephthalate, 0.1 to 2 parts by weight of the styrene-acrylonitrile resin, 0.5 to 2 parts by weight of the epoxy-based compatibilizer, 0.3 to 0.7 parts by weight of the chain extender, 0.3 to 0.5 parts by weight of the antioxidant, 2 to 7 parts by weight of the thermal stabilizer, 0.1 to 0.5 parts by weight of the light stabilizer, and 0.2 to 1.5 parts by weight of the filler, the components were mixed in appropriate amounts, confirming that all properties including blow moldability, mechanical properties, and heat resistance were balanced and excellent quality resulted.

Thus, the thermoplastic resin composition according to the present disclosure can provide a material having high durability and high oil resistance, as well as high heat resistance that can be used at about 150° C., by mixing individual components in appropriate amounts.

Therefore, parts such as air intake hoses and the like for an automobile can be manufactured using the thermoplastic resin composition of the present disclosure, in lieu of conventional AEM or TPC-ET as a high heat-resistant polyester-based elastomer, thereby improving durability and lightweightness compared to conventional AEM materials, ultimately increasing fuel efficiency of automobiles and reducing costs.

In addition, the thermoplastic resin composition according to the present disclosure can provide a material capable of being generally applied to automobile engines by increasing the maximum service heat-resistant temperature by 10° C. compared to conventional TPC-ET materials.

As is apparent from the above description, a thermoplastic resin composition according to the present disclosure includes a mixed resin including a thermoplastic polyether-ester elastomer and polybutylene terephthalate, a styrene-acrylonitrile resin, and additives, which are mixed together in appropriate amounts, making it possible to provide a material not only having high heat resistance capable of being used at about 150° C. but also having high durability and high oil resistance.

In addition, when the thermoplastic resin composition according to the present disclosure is applied to an air intake hose, durability and lightweightness can be improved compared to conventional AEM materials, making it possible to increase the fuel efficiency of automobiles and also to reduce the cost.

In addition, the thermoplastic resin composition according to the present disclosure can provide a material capable of being generally applied to automobile engines by increasing the maximum service heat-resistant temperature by 10° C. compared to conventional TPC-ET materials.

The effects of the present disclosure are not limited to the above-mentioned effects. It should be understood that the effects of the present disclosure include all effects that can be inferred from the description of the present disclosure.

Although specific embodiments of the present disclosure have been described, those skilled in the art will appreciate that the present disclosure may be embodied in other specific forms without changing the technical spirit or essential features thereof. Thus, the embodiments described above should be understood to be non-limiting and illustrative in every way.

The invention claimed is:

1. A thermoplastic resin composition, comprising:
a mixed resin comprises a thermoplastic polyether-ester elastomer and polybutylene terephthalate;
a styrene-acrylonitrile resin;
an epoxy-based compatibilizer;
a chain extender;
an antioxidant;
a thermal stabilizer comprising at least one selected from the group consisting of an imide-based stabilizer, an oxazoline-based stabilizer, and combinations thereof;
a light stabilizer; and
a filler;
wherein the composition further comprises:
    100 parts by weight of the mixed resin;
    0.1 to 2 parts by weight of the styrene-acrylonitrile resin;
    0.5 to 2 parts by weight of the epoxy-based compatibilizer;
    0.3 to 0.7 parts by weight of the chain extender;
    0.3 to 0.5 parts by weight of the antioxidant;
    2 to 7 parts by weight of the thermal stabilizer;
    0.1 to 0.5 parts by weight of the light stabilizer; and
    0.2 to 1.5 parts by weight of the filler.

2. The thermoplastic resin composition of claim 1, wherein the mixed resin comprises, based on a total weight of the mixed resin, 50 to 90 wt % of the thermoplastic polyether-ester elastomer and 10 to 50 wt % of the polybutylene terephthalate.

3. The thermoplastic resin composition of claim 1, wherein the styrene-acrylonitrile resin has a weight average molecular weight (Mw) of 100,000 to 150,000 g/mol.

4. The thermoplastic resin composition of claim 1, wherein the chain extender comprises carbonyl biscaprolactam.

5. The thermoplastic resin composition of claim 1, wherein the antioxidant of a phenol-based antioxidant and a phosphorus-based antioxidant, and the antioxidant comprises, based on a total weight of the antioxidant, 50 to 70 wt % of the phenol-based antioxidant and 30 to 50 wt % of the phosphorus-based antioxidant.

6. The thermoplastic resin composition of claim 1, wherein the thermal stabilizer comprises, based on a total weight of the thermal stabilizer, 50 to 70 wt % of the imide-based stabilizer and 30 to 50 wt % of the oxazoline-based stabilizer.

7. The thermoplastic resin composition of claim 1, wherein the imide-based stabilizer has a weight average molecular weight (Mw) of 20,000 g/mol or more.

8. The thermoplastic resin composition of claim 1, wherein the imide-based stabilizer comprises polymeric bis-(2,6-diisopropylphenyl) carbodiimide, and the oxazoline-based stabilizer comprises 1,3-bis(4,5-dihydro-2-oxazolyl)benzene.

9. The thermoplastic resin composition of claim 1, wherein the light stabilizer comprises at least one selected from the group consisting of a hindered amine-based light stabilizer (HALS), an oxanilide-based light stabilizer, and combinations thereof.

10. The thermoplastic resin composition of claim 1, wherein the filler comprises at least one selected from the group consisting of nanoclay, talc, mica, calcium carbonate, wollastonite, barium sulfate, and combinations thereof.

11. The thermoplastic resin composition of claim 1, further comprising, based on 100 parts by weight of the mixed resin, 1 to 2 parts by weight of a master batch comprising carbon black or dye black.

12. A molded article comprising the thermoplastic resin composition of claim 1.

* * * * *